United States Patent
Matsumoto et al.

(10) Patent No.: US 6,429,788 B2
(45) Date of Patent: Aug. 6, 2002

(54) ALARMING APPARATUS AND METHOD FOR AUTOMOTIVE VEHICLE

(75) Inventors: Shinji Matsumoto; Masahiko Iwasaki, both of Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/875,125

(22) Filed: Jun. 7, 2001

(30) Foreign Application Priority Data

Jun. 27, 2000 (JP) ........................................ 2000-192104

(51) Int. Cl.$^7$ ................................................. G08G 1/00
(52) U.S. Cl. ..................... 340/901; 340/425.5; 340/438; 701/73; 701/80
(58) Field of Search .............................. 340/901, 425.5, 340/438, 439, 442; 701/73, 74, 75, 80, 91; 180/197; 280/433

(56) References Cited

U.S. PATENT DOCUMENTS

| | | | | |
|---|---|---|---|---|
| 5,028,095 | A | 7/1991 | Okubo .................. | 303/100 |
| 6,015,192 | A | 1/2000 | Fukumura ............. | 303/140 |
| 6,094,614 | A * | 7/2000 | Hiwatashi .............. | 701/89 |
| 6,121,895 | A * | 9/2000 | Beeson .................. | 340/901 |
| 6,308,115 | B1 * | 10/2001 | Yamaguchi et al. ...... | 701/1 |
| 6,330,507 | B1 | 12/2001 | Adachi et al. .......... | 701/96 |

FOREIGN PATENT DOCUMENTS

| | | |
|---|---|---|
| DE | 197 45 231 | 4/1998 |
| EP | 0 982 172 | 3/2000 |
| JP | 10-119673 | 5/1998 |
| JP | 11-34696 | 2/1999 |
| JP | 11-334555 | 12/1999 |

OTHER PUBLICATIONS

Patent Abstracts of Japan, Publication No. 10096622, Published Apr. 14, 1998.
T. Iijima et al., "Development of Adaptive Cruise Control with Brake Actuation", Journal of Society of Automotive Engineers of Japan, vol. 53, No. 11, pp. 98–103, Nov., 1999.

* cited by examiner

Primary Examiner—Anh La
(74) Attorney, Agent, or Firm—Foley & Lardner

(57) ABSTRACT

In alarming apparatus and method for an automotive vehicle, a vehicular running state is detected, a frictional coefficient of a road surface on which the vehicle is running is detected, a vehicle using road surface frictional coefficient that corresponds to a road surface frictional force the presently running vehicle is using is calculated on the basis of the detected vehicular running state, a road surface frictional coefficient utilization rate is calculated which is a rate of the calculated vehicle using road surface frictional coefficient of the road surface to a maximum frictional coefficient detected by the road surface frictional coefficient detector, and an alarm controlling section is calculated to output an alarm command to an alarm device to issue an alarm when the calculated road surface frictional coefficient utilization rate is equal to or larger than a set value.

18 Claims, 4 Drawing Sheets

A CASE WHERE THE VEHICLE IS RUNNING ON A HIGH μ ROAD SURFACE WITH THE FOLLOWING CONTROL ACTIVATED
(IN THE CASES OF ② AND ③, Rμk > Rμ)

①

Xgk1 ≦ Xgs

②  NO ALARM

Xgk1 > Xgs

③  ALARM OK

A CASE WHERE THE VEHICLE IS RUNNING ON A LOW μ ROAD SURFACE WITH THE FOLLOWING CONTROL ACTIVATED
(IN THE CASES OF ②' AND ③', Xgk1 ≦ Xgs)

①'

Rμk > Rμ

②'  NO ALARM

Rμk ≦ Rμ

③'  ALARM OK

ALARMING APPARATUS AND METHOD FOR AUTOMOTIVE VEHICLE

BACKGROUND OF THE INVENTION

1. Field of the Invention

The present invention relates to alarming apparatus and method for an automotive vehicle.

2. Description of the Related Art

Japanese Patent Application First Publications No. Heisei 11-34696 published on Feb. 9, 1999 and Heisei 10-119673 published on May 12, 1998 exemplify first and second previously proposed alarming apparatuses applied to automotive vehicles.

In the former above-described Japanese Patent Application First Publication (JP1134696), the vehicle is too approaching to the preceding vehicle in a case where another vehicle is interrupted into a space as ne preceding vehicle between the vehicle and the old preceding vehicle. At this time, a blink of an alarm lamp or a sound of an alarm buzzer is activated to inform the driver of such an abrupt approach to the other vehicle as described above so that the driver is forcefully pressed to manipulate a brake system of the vehicle.

The latter above-described Japanese Patent Application First publication (JP10119673) discloses a technique in which a predicted arrival time duration for the vehicle to arrive at an obstacle on the basis of an obstacle information and vehicular information is calculated and an alarm device is activated on the basis of a relationship between an alarm timing and the predicted arrival time in terms of a time concept.

SUMMARY OF THE INVENTION

However, in the previously proposed alarming apparatus disclosed in the former Japanese Patent Application Publication, a determination of whether the vehicle is about to collide against a rear portion of the preceding vehicle is set in accordance with such a deceleration as would be developed by means of a preceding vehicle following adaptive vehicular velocity control apparatus.

For example, in a case where the inter-vehicle distance from the vehicle to the preceding vehicle indicates such an inter-vehicle distance as requiring the deceleration equal to or larger than 0.2 G, the previously proposed alarming apparatus issues an alarm to the vehicle driver.

In other words, no consideration of a road surface frictional coefficient of a road surface on which the vehicle is running is taken but only the alarm-in accordance with the inter-vehicle distance to the preceding vehicle and the relative velocity is issued. Even if the vehicle is running on a road surface having a low road surface frictional coefficient, the alarm is issued at the same timing as the vehicular run on a high frictional coefficient.

The alarm at this timing is effective in terms of avoidance of the vehicle from a possible collision against the preceding vehicle.

However, for example, in cases where the deceleration of 0.15 G is developed during the vehicular run on the road surface having the road surface frictional coefficient of 1.0 and where the same deceleration of 0.15 G is developed during the vehicular run on the road surface having the road surface frictional coefficient of 0.3, the same deceleration of 0.15 G can be developed and the alarm is not issued since 0.15 G is smaller than 0.2 G.

Actually, however, a safety margin of the vehicle is different in such a way as the margin becomes smaller, as the frictional coefficient of the road surface on which the vehicle is running becomes lower. It is difficult for the vehicle driver to recognize this state when the vehicle is running on the road surface having the low frictional coefficient.

On the other hand, in the vehicular alarming apparatus disclosed in the latter Japanese Patent Application first Publication, no consideration of the frictional coefficient of the road surface on which the vehicle is running is taken but only the alarm is issued in accordance with a predicted arrival time duration toward an obstacle placed in the forward direction.

For example, in a case where the inter-vehicle distance between the vehicle and the preceding vehicle and the relative velocity of the vehicle to the preceding vehicle are the same, the same predicted arrival time durations are resulted where the vehicle is running on the road surface having the low road surface frictional coefficient and having the high road surface frictional coefficient and the alarm is issues at the same timing.

Hence, the timing at which the alarm is issued becomes delayed when the vehicle is running on the road surface of the low frictional coefficient having the small vehicular safety margin. It is difficult for the vehicle driver to recognize such a situation as described above when the vehicle is running on the low frictional road surface.

It is an object of the present invention to provide alarming apparatus and method for an automotive vehicle which can have the vehicle driver recognize that a vehicular safety margin is reduced at an appropriate timing irrespective of a magnitude of the road surface frictional coefficient.

According to one aspect of the present invention, there is provided an alarming apparatus for an automotive vehicle, comprising: a running state detector to detect a vehicular running state; a road surface frictional coefficient detector to detect a frictional coefficient of a road surface on which the vehicle is running; a vehicle using road surface frictional coefficient calculating section that calculates a vehicle using road surface frictional coefficient that corresponds to a road surface frictional force the presently running vehicle is using on the basis of the detected vehicular running state; a road surface frictional coefficient utilization rate calculating section that calculates a road surface frictional coefficient utilization rate which is a rate of the calculated vehicle using road surface frictional coefficient of the road surface to a maximum frictional coefficient detected by the road surface frictional coefficient detector; and an alarm controlling section that outputs an alarm command to an alarm device to issue an alarm when the calculated road surface frictional coefficient utilization rate is equal to or larger than a set value.

According to another aspect of the present invention, there is provided an alarming method for an automotive vehicle, comprising: detecting a vehicular running state; detecting a frictional coefficient of a road surface on which the vehicle is running; calculating a vehicle using road surface frictional coefficient that corresponds to a road surface frictional force the presently running vehicle is using on the basis of the detected vehicular running state; calculating a road surface frictional coefficient utilization rate which is a rate of the calculated vehicle using road surface frictional coefficient of the road surface to a maximum frictional coefficient detected at the frictional coefficient detection; and outputting a command to an alarm device to issue an alarm when the calculated road surface frictional coefficient utilization rate is equal to or larger than a set value.

According to a still another aspect of the present invention, there is provided an alarming apparatus for an automotive vehicle, comprising: running state detecting means for detecting a vehicular running state; road surface frictional coefficient detecting means for detecting a frictional coefficient of a road surface on which the vehicle is running; vehicle using road surface frictional coefficient calculating means for calculating a vehicle using road surface frictional coefficient that corresponds to a road surface frictional force the presently running vehicle is using on the basis of the detected vehicular running state; road surface frictional coefficient utilization rate calculating means for calculating a road surface frictional coefficient utilization rate which is a rate of the calculated vehicle using road surface frictional coefficient of the road surface to a maximum frictional coefficient detected by the road surface frictional coefficient detecting means; and alarm controlling means for outputting a command to an alarm device to issue an alarm when the calculated road surface frictional coefficient utilization rate is equal to or larger than a set value.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
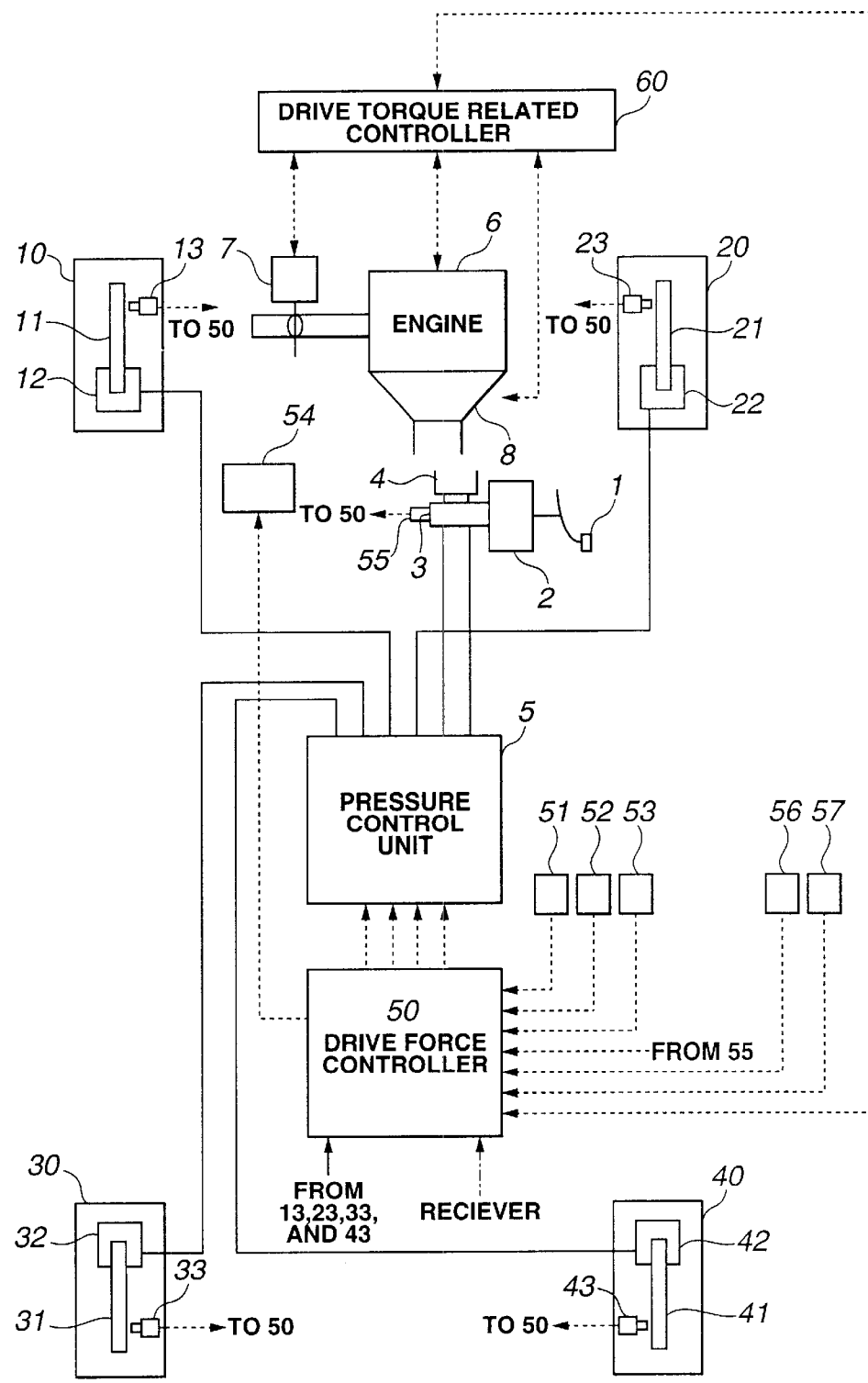
FIG. 1 is a schematic circuit block diagram of an alarming apparatus for an automotive vehicle in a preferred embodiment according to the present invention.

FIG. 1 shows a whole system configuration of a rear-wheel drive vehicle (an automatic transmission mounted and a conventional differential mounted vehicle) to which an alarming apparatus in the preferred embodiment according to the present invention is applicable. A brake system of the vehicle shown in FIG. 1 can control left road wheel and right road wheel braking forces (brake liquid pressures) independently of each other on rear and front road wheels independently of each other.

In FIG. 1, a brake pedal 1, a booster 2, a master cylinder 3, and a reservoir 4 are disposed in the brake system. Left and right front road wheels 10 and 20 and left and right rear road wheels 30 and 40 are disposed in the vehicle. Each of the four road wheels 10, 20, 30, and 40 is provided with a brake disc 11, 21, 31, and 41, a wheel cylinder 12, 22, 32, and 42 for frictionally grasping the brake disc 11, 21, 31, and 41 to give a braking force for each road wheel by a supply of a liquid pressure. When the liquid pressure is supplied to each wheel cylinder 12, 22, 32, and 42 of the brake system from a pressure control unit 5, each road wheel 10, 20, 30, and 40 is individually controlled. Pressure control unit 5 is constituted by an actuator included in an individual liquid pressure supply system (each channel) at front and rear-left and right road wheels. A proportional solenoid valve is used to enable a control over a brake liquid pressure in each wheel cylinder to an arbitrary braking liquid pressure as the actuator.

Pressure control unit 5 adjusts a hydraulic pressure from master cylinder 3 in response to an input signal from the drive force controller 50 and controls the braking liquid pressure supplied to the wheel cylinders 12, 22, 32, and 42 of respective road wheels. In addition, drive force controller 50 performs the engine control such as to control a fuel injection quantity of an engine 6, a throttle valve control such as to control an opening angle of an engine throttle valve through a throttle controller 7, and performs an automatic transmission control such as to control a gear ratio of an automatic transmission 8 so as to perform a drive torque control via a drive torque related controller 60 which controls the drive torque of the drive torque of the driven wheels.

Drive force controller 50 receives signals a signal from an accelerator sensor 52 detecting a vehicular longitudinal acceleration Xg and a vehicular lateral acceleration Yg, signals from wheel velocity sensors 13, 23, 33, and 43 installed on the respectively corresponding road wheels to detect respectively corresponding road wheel velocities Vwi, and a signal indicating a set position of a switch 53 to set a set vehicular velocity Vc manually by the vehicle driver. Drive force controller 50 receives signals from a master cylinder liquid pressure sensor 55 to detect a master cylinder liquid pressure Pm in order to detect a manipulated variable of brake pedal 1, a signal from an accelerator opening angle sensor 56 to detect an opening angle Acc of accelerator in order to detect a manipulated variable of an accelerator pedal, and a signal indicating a drive torque Tw on a wheel axle from drive torque related controller 60.

Figure 4A:
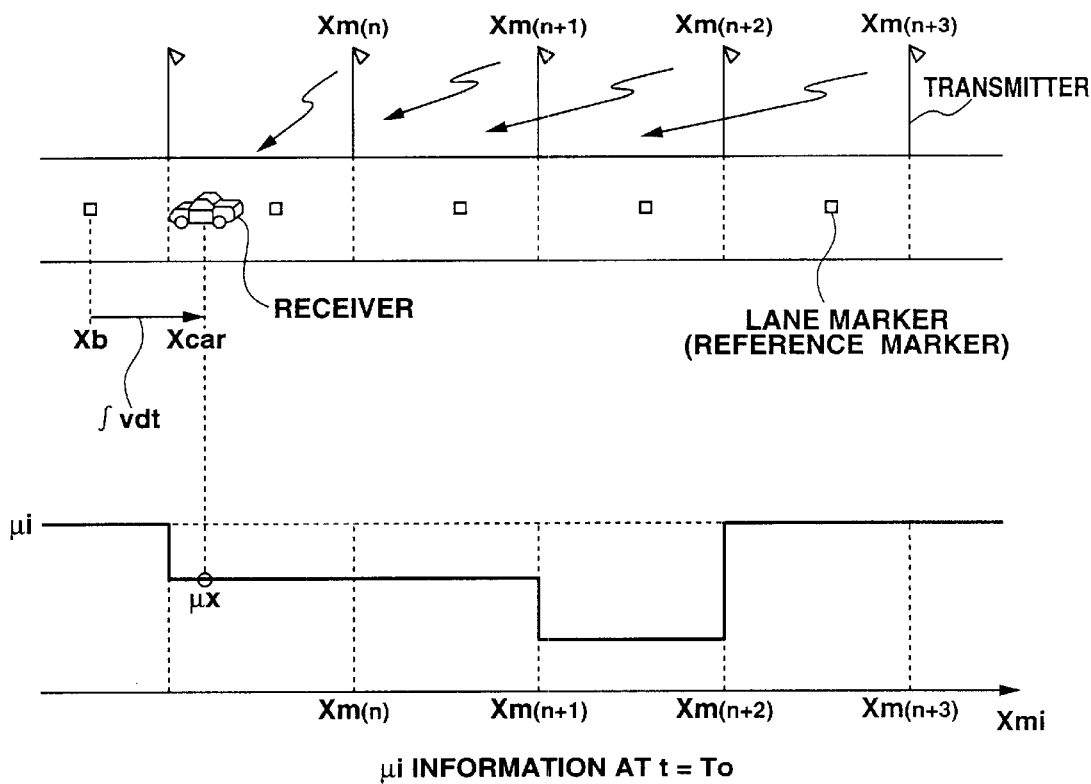
FIG. 4A is an explanatory view for explaining an example of positional information of the vehicle and road surface frictional coefficient information which are obtained from an infrastructure used in the preferred embodiment of the alarming apparatus shown in FIG. 1.

After a road surface frictional coefficient $\mu$ is received from a receiver 57 and is outputted into drive force controller 50. It is noted that road surface frictional coefficient $\mu$ transmitted from the infrastructure is a data in a unit of 0.1 and ranges from 0.1 to 1.0. In addition, as shown in FIG. 4, a reference position Xb (from a lane marker such as to enable obtaining of a positional information) is simultaneously obtained with the present position Xcar of the vehicle as an estimation enabled information. In addition, an alarm buzzer 54 to have the vehicle driver recognize that there is a possibility of collision of the vehicle against the preceding vehicle and that the safety margin of the vehicle becomes small is disposed within a passenger compartment and the alarm is issued in accordance with the output from the drive force controller 50.

Next, an operation of the alarming apparatus shown in FIG. 1 will be described below.

[Alarming Process]

Figure 2:
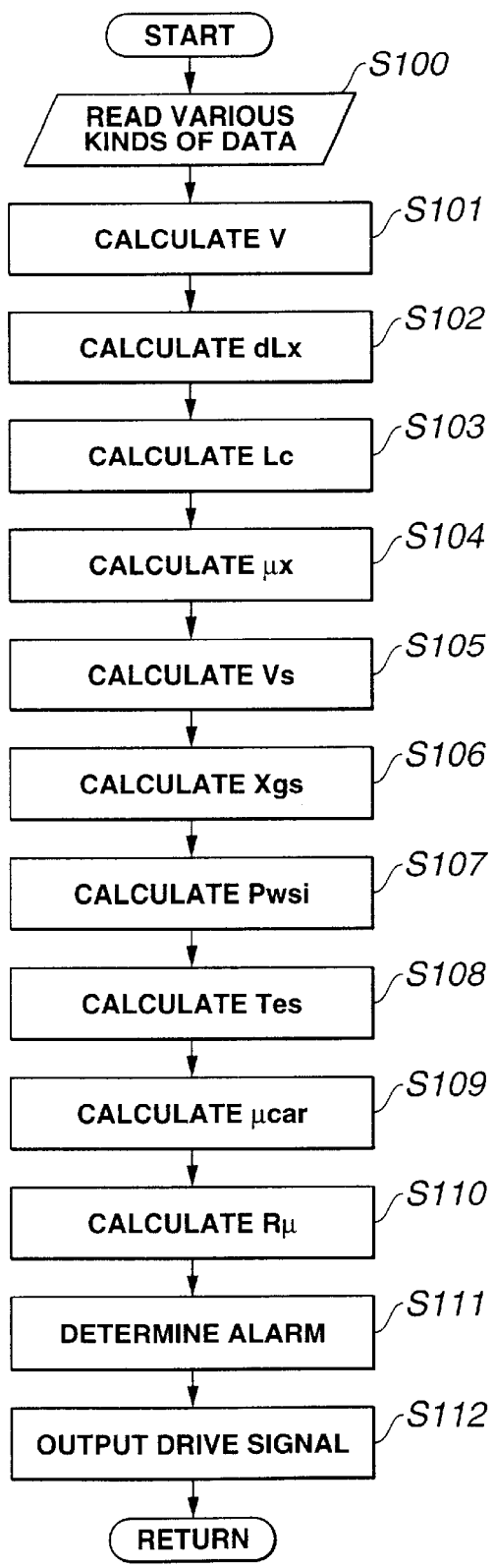
FIG. 2 is an operational flowchart representing an example of a control program executed in a drive force related controller shown in FIG. 1.

FIG. 2 shows a flowchart representing a control procedure executed by drive force controller 50. It is noted that the term drive force used in the specification includes the brake force as well as the drive force.

This procedure shown in FIG. 2 is executed as a regular time interrupt routine whenever a predetermined time duration has passed by monitoring a time duration through an operating system of drive force controller 50. It is noted that drive force controller 50 generally includes a microcomputer having a CPU (Central Processing Unit), a ROM (Read Only Memory), a RAM (Random Access Memory), an Input Port, an Output Port, an interrupt routine controller, a DMA (Direct Memory Access) controller, and a common bus.

At a step S100, drive force controller 50 reads various data from respective sensors 13, 23, 33, 43, 51, 52, 53, 55, 56, and 57 and drive torque controller 60.

In details, controller 50 stores into a memory such as RAM respective road wheel velocities Vwi(i=1 through 4) from road wheel velocity sensors 13, 23, 33, and 43, vehicular longitudinal acceleration Xg and lateral acceleration Yg from acceleration sensor 52 (corresponds to a vehicular running state detector), an accelerator opening angle Acc from accelerator opening angle sensor 56, master cylinder liquid pressure Pm from master cylinder liquid pressure sensor 55, the set vehicular velocity from switch 53, and the road surface frictional coefficient $\mu i$, the position Xmi, and reference position Xb from the road-and-vehicle communicating receiver 57. It is noted that i denotes a plural number and the road surface frictional coefficient $\mu i$ is stored into the memory as a function of position Xm: That is to say, $$\mu i = f(Xmi) \quad (1).$$

In addition, drive force controller 50 reads drive torque Tw and inter-vehicle distance Lx to the preceding vehicle from a drive torque controller 60.

At a step S101, drive force controller 50 calculates a vehicular velocity V of the vehicle. In this embodiment, drive force controller 50 calculates a vehicular velocity V from an average value of the front road wheel velocities in accordance with road wheel velocities Vwi during a normal run.

$$V = (Vw1 + Vw2)/2 \quad (2).$$

In addition, in a case where an ABS (Anti-Lock Brake System) control is activated, drive force controller 50 may calculate the vehicular velocity from a pseudo vehicular velocity estimated in ABS controller.

At a step S102, drive force controller 50 estimates the relative velocity dLx to the preceding vehicle. In the embodiment, drive force controller 50 calculates the relative velocity dLx in accordance with the following equation (3) according to the inter-vehicle distance Lx to the preceding vehicle. That is to say, $$dLx = k1 \cdot (Lx(n) - Lx(n-1))/\Delta T \quad (3).$$

It is noted that, in the equation (3), $\Delta T$ denotes a calculation period, k1 denotes a conversion constant, and n denotes a calculation timing.

At a step S103, drive force controller 50 calculates a target inter-vehicle distance Lc to the preceding vehicle. In this embodiment, target inter-vehicle distance Lc is calculated from vehicular velocity V in accordance with the following equation (4). That is to say, $$Lc = Kv1 \cdot V + Kv2 \quad (4).$$

In the equation (4), Kv1 and kv2 denote control constants.

In this embodiment, drive force controller 50 calculates target inter-vehicle distance Lc merely in accordance with the vehicular velocity V. A manual setting of the inter-vehicle distance by the driver may be used to set the target inter-vehicle distance.

For example, if the driver sets the target inter-vehicle distance from three stages of long, middle, and short, control constants in the equation (4) may be modified, and target inter-vehicle distance Lc may be modified.

At a step S104, drive force controller 50 calculates a road surface frictional coefficient $\mu x$ at the present position of the vehicle (corresponds to a road surface frictional coefficient detector).

In this embodiment, the road surface frictional coefficient $\mu x$ at the present position of the vehicle on the basi of $\mu i = f(Xmi)$ inequation (1) which is the function of the road surface frictional coefficient $\mu i$ and the position Xmi received from the road-and-vehicle communications with the infrastructure.

First, drive force controller 50 calculates the present position Xcar of the vehicle according to an integration of a latest reference position Xb and vehicular velocity V of the vehicle.

$$Xcar = Xb + \int Vdt \text{ (integration from a time at which the vehicle has passed reference position to the present time)} \quad (5).$$

Next, a reference road surface frictional coefficient $$\mu x0 = f(Xcar) \quad (6)$$

It is noted that since the road surface functional coefficient $\mu i$ is-varied in accordance with an internal of distance installed in the infrastructure, the road surface frictional coefficient is discontinuous with respect to the position Xcar of the vehicle. Hence, a first order filter is supplied to the reference road surface frictional coefficient $\mu x0$ to smooth $\mu x0$ to derive the road surface frictional coefficient $\mu x$.

At a subsequent step S105, drive force controller 50 calculates a target vehicular velocity Vs according to the set vehicular velocity Vc set manually by the vehicular driver, the inter-vehicle distance Lx, target inter-vehicle distance Lc, and relative velocity dLx. In this embodiment, target vehicular velocity Vs is calculated in accordance with the following equation: That is to say, $$Vs = Min(Vc, k1p \cdot (Lx - Lc) + k1d \cdot dLx + V) \quad (7).$$

It is noted that k1p and k1d denote control gains, Min(a, b) denotes a function to select a minimum value from a and b.

It is noted that (Lx−Lc)<0 denotes a narrowed inter-vehicle distance and dLx indicates minus when the vehicle is approaching to the preceding vehicle.

At a step S106, drive force controller 50 calculates a target acceleration Xgs. In this embodiment, target acceleration Xgs is calculated according to vehicular velocity V and target vehicular velocity Vs in accordance with the following equation (it is noted that the acceleration indicates positive and the deceleration indicates negative). That is to say, $$Xgs = kp \cdot \epsilon + ki \cdot \int \epsilon dt + Kd \cdot d\epsilon/dt \quad (8).$$

$$\epsilon = Vs - V \quad (9).$$

It is noted that, in the equations (8) and (9), kp, ki, and kd denote control gains (proportional control gain, integration control gain, and differential control gain). The contents of steps S105 and S106 correspond to a vehicular velocity controlling section (vehicular velocity controlling means).

At a step S107, drive force controller 50 calculates a target braking liquid pressure Pwsi. In this embodiment, target braking liquid pressure Pwsi is modified in accordance with the following equation according to target acceleration Xgs, master cylinder liquid pressure Pm, and brake requirements.

1) $Xgs<0 Pwsi=Max(Kxi*Xgs, kb*Pm)$ (10).

2) $Xgs\leq 0 Pwsi=Max(0, kb*Pm)$ (11).

In equations (10) and (11), kxi and kb denote coefficients (pad $\mu$ of each road wheel, w/c area, an effective radius of a rotor, and a tire effective radius).

At a step S108, drive force controller 50 calculates a target drive force torque Tes in accordance with the following equations (12 and 13) according to a drive train specifications.

1) $Xgs<0;Tgs=Max(0, ka*Acc)$ (12)

and

2) $Xgs\leq 0 Tes=Max[kt*Xgs, Ka*Acc]$ (13).

It is noted that ka and kt denote variables determined according to drive system requirements (gear inertia, gear ratio, transmission efficiency, engine characteristic, and so forth). It is also noted that in this case no consideration of an engine brake is paid. Steps S107 and S108 correspond to drive force controlling section.

At a step S109, drive force controller 50 calculates a vehicle using frictional coefficient $\mu$ car which is a road surface fictional force (a resultant force between the longitudinal force and lateral force developed on whole road wheels) that the vehicle is presently using during the vehicular run (corresponds to a vehicle using road surface frictional coefficient calculating section). In this embodiment, the vehicle using road surface frictional coefficient $\mu$ car is calculated in accordance with the following equation according to the vehicular longitudinal acceleration kg, the lateral acceleration kg, and target acceleration kgs.

$\mu car=\sqrt{(Xgh^2+Yg^2)}$ (14).

In this equation, Xgh denotes a vehicular longitudinal acceleration correction value and is expressed as follows: That is to say, $Xgh=Max(|Xg|, |Xgs|)$ (15).

In this way, by using one of the values of actually developing longitudinal acceleration Xg and target acceleration Xgs which is larger than the other, such a merit that the fact is previously known how the safety margin is varied immediately before the acceleration or deceleration is actually developed by means of the control can be exhibited.

At a step S110, drive force controller 50 calculates a utilization rate $R\mu$ of road surface frictional coefficient according to the road surface frictional coefficient calculated at S104 and vehicle using road surface frictional coefficient $\mu$car calculated at step S109 (corresponds to a vehicle using road surface coefficient utilization rate calculating section). In the embodiment, the utilization rate is calculated in accordance with the following equation: That is to say, $R\mu=\mu car/\mu x$ (16).

At a step Sill, drive force controller 50 determines whether the alarm should be issued. In this embodiment, drive force controller 50 determines whether the alarm should be issued on the basis of two kinds of information. The first one is a possibility of a future collision of vehicle against the preceding vehicle. An acceleration threshold value Xgk1 (for example, -0.2 G) set with a capacity of brake force controlling system and an influence on the vehicular driver during the deceleration in mind is compared with target acceleration Xgs.

If $Xgk1>Xgs$ (17), an alarm issuance flag $F_{ON}$ is turned to ON ("1"). Second, drive force controller 50 turns alarm issuance flag $F_{ON}$ to "1" in a case where $R\mu 9k\leq R\mu$ (18), wherein $R\mu$ denotes the road surface frictional coefficient, $R\mu k$ denotes a threshold value (for example, 0.5) when utilization rate is high and, in this case, safety margin of the vehicle is determined to be small.

On the other hand, if neither equation (17) nor equation (18) is established, the alarm issuance flag $F_{ON}$ is turned to OFF ("0").

At a step S112, drive force controller 50 outputs drive signals to pressure control unit 5 and drive torque related controller 60, respectively, in accordance with target braking liquid pressure Pwsi and target drive torque Tes. In addition, if the alarm issuance flag $F_{ON}$ determined at step S111 is turned to ON, drive force controller 50 issues a buzzer sound in order to make the vehicle driver recognize that there is a possibility of the collision of the vehicle against the preceding vehicle and the safety margin of vehicle becomes decreased. Steps S111 and S112 correspond to alarming control section.

[Alarming Operation]

For example, a following control to follow the preceding vehicle on the high frictional coefficient road surface will be described below.

Figure 3A:
FIGS. 3A and 3B are explanatory views for explaining alarm operations during a vehicular run on a high frictional coefficient road surface and a low frictional coefficient road surface on which the vehicle in which the alarming apparatus shown in FIG. 1 is mounted is running to follow a preceding vehicle.
Figure 3A:
Figure 3A:

If both of the vehicle (host vehicle) and the preceding vehicle are running at a cruise speed of each vehicular velocity V1 as shown in ① of FIG. 3A and, thereafter, are slowed down at reduced vehicular velocities as shown in ② and ③ of FIG. 3A, the road surface frictional coefficient utilization rates $R\mu$ of both vehicles are smaller than threshold value of $R\mu k$.

Then, in a case of ② of FIG. 3A wherein a deceleration-oriented target acceleration (hereinafter, referred to as a target deceleration) Xgs is equal to or larger than a deceleration-oriented acceleration threshold value (hereinafter, referred to as a deceleration threshold value) Xgk, alarm issuance flag $F_{ON}$ is turned to "0" (OFF) at step S111. No issuance of alarm occurs in this case.

However, in a case of ③ of FIG. 3A wherein target deceleration Xgs is smaller than deceleration threshold value Xgk1 (Xgk1>Xgs), alarm issuance flag $F_{ON}$ is turned to "1" (ON) and the alarm is issued.

Next, the following control to follow the preceding vehicle on the low frictional coefficient road surface shown in FIG. 3B will be described below.

Figure 3B:
Figure 3B:
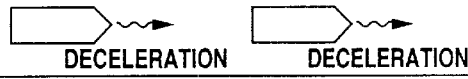
Figure 3B:

First, if both of the vehicle (host vehicle) and the preceding vehicle are running at the cruise speed of V1 as shown in ①' of FIG. 3B and, thereafter, are decelerated as shown in ②' and ③' of FIG. 3B, target deceleration Xgs of the vehicle is equal to or larger than deceleration threshold value Xgk1 since the vehicle is running on a low frictional road surface. In a case of ②' where utilization rate $R\mu$ of road surface frictional coefficient is smaller than threshold value (set value) $R\mu k$, the alarm issuance flag $F_{ON}$ at step Sill of FIG. 2 is turned to "1" (off). Thus, the alarm issuance does not occur. However, in a case of ③' wherein the utilization rate $R\mu$ of the road surface frictional coefficient is equal to or larger than the threshold value $R\mu k$, the alarm issuance flag $F_{ON}$ is turned to "1" (ON) at step S111 of FIG. 2 and, thus, the alarm is issued.

That is to say, in a case where the forward road surface frictional coefficient is small, the alarm is issued in accordance with the road surface frictional coefficient $R\mu$. Thus, in a case where the deceleration is not so large that is decelerated according to the following control, the driver can recognize that the safety margin of the vehicle is reduced.

Since the alarm in accordance with the possibility of collision against the preceding vehicle is directly used, for example, the vehicle is running using the preceding vehicle following control on the high frictional coefficient road surface as shown in FIG. 3A. There is quite few that the utilization rate of road surface coefficient $R\mu$ becomes large. Hence, the alarm due to the deceleration is a mainly implemented alarm process.

(Other Embodiments and Alternatives)

In the preferred embodiment, the control equations described in the equations (7) through (13) are used in the vehicular velocity control portion based on the inter-vehicle distance to the preceding vehicle. A feed-forward control plus a feedback control may be used as described in Automotive Engineering Society Journal, November, 1999 (pages 98 through 103, titled as "Development of Adaptive Cruise Control with Brake Actuation" authored by Tetsuya Iijima et al). A European Patent Application Publication No. EP 0 982 172 A2 published on Mar. 1, 2000 describes the feed-forward control and the feedback control system in the vehicular velocity control apparatus.

In details, since the present invention relates to the alarm occurrence in accordance with the utilization rate of the road surface frictional coefficients, various control rules are applicable to the control portion of the inter-vehicle distance.

In the preferred embodiment, the alarm is issued in accordance with the utilization rate of the road surface frictional coefficient with the vehicular velocity control having the inter-vehicle distance maintenance control as a prerequisite.

However, the present invention is applicable not only to an automotive vehicle in which such a chassis control system as described above is not installed but also to another automotive vehicle in which no such a chassis control system as described above is installed. That is to say, the vehicle using road surface frictional coefficient is calculated according to the vehicular run state, the road surface frictional coefficient utilization rate is determined according to the detected road surface frictional coefficient, and the alarm is issued in accordance with the utilization rate.

In this case, the chassis control is especially specified. For example, in a case where the system in which the target value is set in the longitudinal acceleration and lateral acceleration, target acceleration Xgs (or Ygs) is used in a portion corresponding to step S109 of the flowchart shown in FIG. 2. In a case where the system in which no target value is set in the longitudinal acceleration and lateral acceleration, target acceleration Xgs is not present but only the vehicular longitudinal acceleration Xg is always used.

In this embodiment, the vehicular forwarding road surface frictional coefficient is detected on the basis of the obtained information which is received from the measured information by the infrastructure installed on the road via a wireless communication. However, the vehicular forwarding road surface frictional coefficient may be derived from the vehicular running state as disclosed in a Japanese Patent Application First Publication No. Heisei 11-334555 published on Dec. 7, 1999 or may be estimated in accordance with the drive/brake force applied at the time of acceleration/deceleration during the vehicular control and the slip rates of the respective road wheels. The method of estimating the slip rate is also exemplified by a U.S. Pat. No. 6,015,192 issued on Jan. 18, 2000 the disclosure of which is herein incorporated by reference).

The above-described Japanese Patent Application First Publication (JP11334555) describes the road surface frictional coefficient estimating apparatus comprising: road wheel velocity detecting means for detecting road wheel velocities; vehicular body velocity detecting means for detecting a vehicular body velocity; driving/braking force detecting means for detecting a braking force or braking force exerted on each road wheel; slip rate calculating means for receiving one of the detected road wheel velocities which corresponds to the road wheel and the detected vehicular body velocity and calculating a slip rate for the corresponding road wheel; a pseudo $\mu$-s function generating means for receiving the slip rate for each road wheel and generating a pseudo $\mu$-s function which is analogous function to a $\mu$-s function representing a functional coefficient developed between a road surface and a road wheel; a road wheel velocity estimation error calculating means for receiving the road wheel velocities, a driving/braking force, and the estimated value of the road surface frictional coefficient, and calculating an estimated value of the road wheel velocity which accords with the estimated value of the road surface frictional coefficient, and subtracting the road wheel velocity estimated value from the road wheel velocities to derive an estimation error of the corresponding road wheel velocity; a calibration parameter calculating means for receiving the pseudo $\mu$-s function and calculating a calibration parameter to calibrate the pseudo $\mu$-s function; and calibrating means for receiving the pseudo $\mu$-s function and calibration parameter, calibrating the pseudo $\mu$-s function by the calibration parameter, and outputting the calibration value as the road surface frictional coefficient estimated value. The pseudo function is expressed as follows:

$$\lambda = (Xw-Xv)/Xv (\because Xw > Xv) \text{ or } (Xw-Xv)/Xw (\because Xw < Xv),$$

wherein $\lambda$ denotes a slip rate between the road surface and the corresponding road wheel, Xw denotes the corresponding road wheel velocity, and Xv denotes the vehicular body velocity.

Figure 4B:
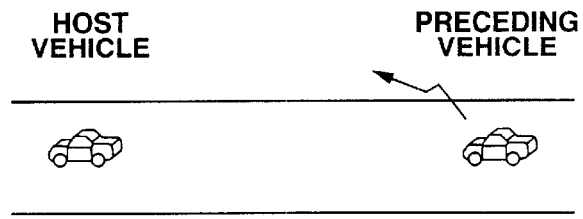
FIG. 4B is an explanatory view for explaining an example of positional information and road surface frictional coefficient information as an alternative of FIG. 4A.

Furthermore, as shown in FIG. 4B, the vehicular forwarding road wheel surface frictional coefficient may be determined on the basis of the obtained information on the road frictional coefficient by a wireless communication from the preceding vehicle which is running ahead of the vehicle (host vehicle). The vehicular forwarding road surface frictional coefficient may be detected on the basis of the obtained information.

In this embodiment, the vehicle using road surface frictional coefficient $\mu$car is calculated according to the vehicular longitudinal and lateral accelerations Xg and Yg. However, the vehicular run state detector may estimate the longitudinal force mXg and lateral force mYg of each road wheel and may calculate the vehicle using road surface frictional coefficient $\mu$car $(_{10, 20, 30, 40})$ for each road wheel 10, 20, 30, and 40 according to estimated values thereof mXg and mYg.

In this case, the utilization rate for the road surface frictional coefficient may be calculated according to a rate of an average value $\mu car_{avg}$ of the vehicle using road surface frictional coefficient of the whole road wheels to a maximum frictional coefficient of the road surface or according to a rate of a rear wheel average value $\mu car_R$ of the vehicle using road surface frictional coefficient and a front wheel average value thereof $\mu car_F$ to the maximum frictional coefficient of the road surface on which the vehicle runs.

In this embodiment, the issuance condition of the alarm is exemplified in a case where the utilization rate $R\mu$ for the road surface frictional coefficient $\mu car$ is equal to or larger than the threshold value $R\mu k$ and in a case where the target acceleration Xgs is less than the acceleration threshold value Xgk1. Otherwise, in a case where the inter-vehicle distance Lx is equal to or shorter than a set value Lx1 or in a case where the relative velocity dLx to the preceding vehicle is equal to or larger than the set value dLx1 may be used. If any one of these (four) conditions is established, the alarm may be issued.

It is noted that a drive force defined in the claims includes a brake force since the drive force is positive and the brake force is negative, the target acceleration Xgs also includes a target deceleration, and the maximum road surface coefficient may be deemed to be equal to the first-order filtered road surface frictional coefficient $\mu x$.

The entire contents of a Japanese Patent Application No. 2000-192104 (filed in Japan on Jun. 27, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. An alarming apparatus for an automotive vehicle, comprising:
    a running state detector to detect a vehicular running state;
    a road surface frictional coefficient detector to detect a frictional coefficient of a road surface on which the vehicle is running,
    a vehicle using road surface frictional coefficient calculating section that calculates a vehicle using road surface frictional coefficient that corresponds to a road surface frictional force the presently running vehicle is using on the basis of the detected vehicular running state;
    a road surface frictional coefficient utilization rate calculating section that calculates a road surface frictional coefficient utilization rate which is a rate of the calculated vehicle using road surface frictional coefficient of the road surface to a maximum frictional coefficient detected by the road surface frictional coefficient detector; and
    an alarm controlling section that outputs an alarm command to an alarm device to issue an alarm when the calculated road surface frictional coefficient utilization rate is equal to or larger than a set value.

2. An alarming apparatus for an automotive vehicle as claimed in claim 1, further comprising:
    an inter-vehicle distance detector to detect an inter-vehicle distance between the vehicle and a preceding vehicle which is running ahead of the vehicle;
    a vehicular velocity controlling section that controls a vehicular velocity of the vehicle in accordance with at least the detected inter-vehicle distance; and
    a vehicular driving force controlling section that controls a driving force exerted on the vehicle in accordance with a vehicular velocity variation command outputted from the vehicular velocity controlling section, and wherein the vehicle using road surface frictional coefficient calculating section calculates a present vehicle using road surface frictional coefficient or the vehicle using road surface frictional coefficient after the driving force control is effected in accordance with the vehicular running state and in response to a driving force control command outputted from the driving force controlling section.

3. An alarming apparatus for an automotive vehicle as claimed in claim 1, wherein the road surface frictional coefficient detector comprises a detector to detect the road surface frictional coefficient of a road surface placed in a vehicular forward direction by obtaining an information of the road surface frictional coefficient measured by a road surface friction coefficient measuring device installed on the road via a wireless communication.

4. An alarming apparatus for an automotive vehicle as claimed in claim 1, wherein the road surface frictional coefficient detector comprises a detector to detect the road surface frictional coefficient of a road surface placed in a vehicular forwarding direction from a preceding vehicle which is running ahead of the vehicle via a wireless communication.

5. An alarming apparatus for an automotive vehicle as claimed in claim 2, wherein the road surface frictional coefficient detector comprises an estimator to estimate the road surface frictional coefficient in accordance with the driving force to be exerted when a vehicular velocity variation rate occurs during an execution of the vehicular velocity control and a slip rate of each road wheel of the vehicle to occur when the vehicular velocity variation rate occurs during the execution of the vehicular velocity control.

6. An alarming apparatus for an automotive vehicle as claimed in claim 1, wherein the running state detector comprises a vehicular longitudinal acceleration detector to detect a vehicular longitudinal acceleration applied to a vehicle body of the vehicle and a vehicular lateral acceleration detector to detect a lateral acceleration thereof and the vehicle using road surface fictional coefficient calculating section calculates the vehicle using road surface frictional coefficient on the basis of the detected vehicular longitudinal acceleration and the detected vehicular lateral acceleration.

7. An alarming apparatus for an automotive vehicle as claimed in claim 2, wherein the running state detector comprises a vehicular longitudinal acceleration detector to detect a vehicular longitudinal acceleration applied to a vehicle body and a vehicular lateral acceleration detector to detect a lateral acceleration applied to the vehicle body and the vehicle using road surface frictional coefficient calculating section calculates the vehicle using road surface frictional coefficient on the basis of the detected vehicular longitudinal acceleration and the detected vehicular lateral acceleration and variation rates of the longitudinal acceleration and the lateral acceleration that would be predicted in the future and that are estimated from a driving force control command value to be issued when a vehicular velocity variation occurs during an execution of the vehicular velocity control.

8. An alarming apparatus for an automotive vehicle as claimed in claim 1, wherein the running state detector comprises an estimator to estimate a longitudinal force and a lateral force of each road wheel and the road surface frictional coefficient utilization rate calculating section calculates the road surface frictional coefficient utilization rate according to a rate of an average value of the use road surface frictional coefficients of all of the vehicular road wheels to the maximum frictional coefficient of the road surface detected by the road surface frictional coefficient detector.

9. An alarming apparatus for an automotive vehicle as claimed in claim 1, wherein the running state detector comprises an estimator to estimate a longitudinal force applied to each road wheel and to estimate a lateral force applied to each road wheel, wherein the vehicle using road surface frictional coefficient calculating section calculates the vehicle using road surface frictional coefficient for each road wheel according to estimated values of the longitudinal force and lateral force for each corresponding road wheel, wherein the road surface frictional coefficient utilization rate calculating section calculates the road surface frictional coefficient utilization rates for front road wheels and for rear road wheels according to rates of a front road wheel average value of the vehicle using road surface frictional coefficients to the maximum frictional coefficient detected by the road surface frictional coefficient detector and of a rear road wheel average value of the vehicle using road surface frictional coefficients to the maximum road surface frictional coefficient, and wherein the alarm controlling section outputs the alarm command to the alarm device when either the road surface frictional coefficient utilization rate calculated according to the front road wheel average value or that calculated according to the rear road wheel average value is equal to or larger than the set value.

10. An alarming apparatus for an automotive vehicle as claimed in claim 2, wherein the alarm controlling section outputs the alarm command to the alarm device when any one of such conditions is established that a case where the road surface frictional coefficient utilization rate is equal to or lager than the set value, a case where the inter-vehicle distance detected by the inter-vehicle distance detector is equal to or longer than another set value, and a case where a relative velocity to the preceding vehicle is equal to or higher than a still another set value.

11. An alarming apparatus for an automotive vehicle as claimed in claim 3, wherein the road surface frictional coefficient detector comprises a road-to-vehicle communicating receiver for receiving the road surface frictional coefficient information and position information from a plurality of transmitters installed aside the road surface on which the vehicle is running at a regular interval of distances.

12. An alarming apparatus for an automotive vehicle as claimed in claim 11, wherein the road surface frictional coefficient detector calculates the road surface frictional coefficient $\mu x$ at the present position Xcar of the vehicle as follows:

$$Xcar = Xb + \int V dt,$$

wherein Xb denotes a latest reference position and V denotes the vehicular velocity, $\mu x0 = f(Xcar)$, and a first-order filter is applied to $f(Xcar)$.

13. An alarming apparatus for an automotive vehicle as claimed in claim 6, wherein the vehicle using road surface frictional coefficient calculating section calculates the vehicle using road surface frictional coefficient $\mu car$ as follows:

$$\mu car = \sqrt{(Xgh^2 + Yg^2)},$$

wherein $Xgh = Max(|Xg|, |xgs|)$, wherein $Max(a, b)$ denotes a selection of larger one of a and b, Xg denotes the vehicular longitudinal acceleration and Xgs denotes a target acceleration, and is expressed as $$Xgs = kp \cdot \in + Ki \cdot \int \in dt + Kd \cdot d\in/dt, \in = Vs - V,$$

and $$Vs = Min(Vc, K1p \cdot (Lx - Lc) + K1d \cdot dLx + V),$$

wherein Vc denotes the set vehicular velocity, Klp denotes a proportional control gain, Kld denotes a differential control gain, Yg denotes the vehicular lateral acceleration, V denotes a vehicular velocity, Lx denotes an inter-vehicle distance, Lc denotes a target inter-vehicle distance, dLx denotes a relative velocity, kp and Kd denote control gains, and Ki denotes an integration control gain.

14. An alarming apparatus for an automotive vehicle as claimed in claim 13, wherein the road surface frictional coefficient utilization rate calculating section calculates the road surface frictional coefficient utilization rate $R\mu$ as follows:

$$R\mu = \mu car / \mu x.$$

15. An alarming apparatus for an automotive vehicle as claimed in claim 13, wherein the alarm controlling section comprises a first comparator to compare Xgs with an acceleration threshold value Xgkl to determine if Xgkl>Xgs and wherein the alarming controlling section outputs the alarm command to the alarm device to issue the alarm when the first comparator determines that Xgkl>Xgs.

16. An alarming apparatus for an automotive vehicle as claimed in claim 13, wherein the alarm controlling section comprises a second comparator to compare the utilization rate $R\mu$ with the set value $R\mu k$ to determine if $R\mu k \leq R\mu$ and wherein the alarm controlling section outputs the alarm command to the alarm device to issue the alarm when the second comparator determines that $R\mu k \leq R\mu$.

17. An alarming method for an automotive vehicle, comprising:

detecting a vehicular running state;

detecting a frictional coefficient of a road surface on which the vehicle is running;

calculating a vehicle using road surface frictional coefficient that corresponds to a road surface frictional force the presently running vehicle is using on the basis of the detected vehicular running state;

calculating a road surface frictional coefficient utilization rate which is a rate of the calculated vehicle using road surface frictional coefficient of the road surface to a maximum frictional coefficient detected at the frictional coefficient detection; and outputting a command to an alarm device to issue an alarm when the calculated road surface frictional coefficient utilization rate is equal to or larger than a set value.

18. An alarming apparatus for an automotive vehicle, comprising:

running state detecting means for detecting a vehicular running state;

road surface frictional coefficient detecting means for detecting a frictional coefficient of a road surface on which the vehicle is running;

vehicle using road surface frictional coefficient calculating means for calculating a vehicle using road surface frictional coefficient that corresponds to a road surface frictional force the presently running vehicle is using on the basis of the detected vehicular running state;

road surface frictional coefficient utilization rate calculating means for calculating a road surface frictional coefficient utilization rate which is a rate of the calculated vehicle using road surface frictional coefficient of the road surface to a maximum frictional coefficient detected by the road surface frictional coefficient detecting means; and alarm controlling means for outputting a command to an alarm device to issue an alarm when the calculated road surface frictional coefficient utilization rate is equal to or larger than a set value.

* * * * *